(12) United States Patent  
Naamad et al.

(10) Patent No.: US 11,797,572 B1  
(45) Date of Patent: Oct. 24, 2023

(54) SYSTEMS, METHODS, AND APPARATUS FOR HOTSPOT DETECTION

(71) Applicant: Amazon Technologies, Inc., Seattle, WA (US)

(72) Inventors: Yonatan Naamad, Sunnyvale, CA (US); Shiva Prasad Kasiviswanathan, Dublin, CA (US); Nina Mishra, Pleasanton, CA (US); Morteza Monemizadeh, Mountain View, CA (US); Lauren Anne Moos, Seattle, WA (US); Joshua M. Tokle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 917 days.

(21) Appl. No.: 16/056,936

(22) Filed: Aug. 7, 2018

(51) Int. Cl.
*G06F 16/27* (2019.01)
*G06F 16/28* (2019.01)

(52) U.S. Cl.
CPC .................. *G06F 16/278* (2019.01); *G06F 16/285* (2019.01)

(58) Field of Classification Search
CPC .......... G06F 16/278; G06K 9/62; G06T 11/20; G06F 16/285
USPC ........................................................ 707/737
See application file for complete search history.

(56) References Cited

U.S. PATENT DOCUMENTS 6,229,918 B1 * 5/2001 Toyama ................ G06F 18/23
382/241

7,343,272 B2 * 3/2008 Iyengar ................ G06F 18/23
706/20

(Continued)

OTHER PUBLICATIONS

Ankerst, M. et al., "OPTICS: Ordering Points To Identify the Clustering Structure," ACM Sigmod Record, Vol. 28, 12 pages. ACM, 1999.

Arthur, D. and Vassilvitskii, S. "k-means++: The Advantages of Careful Seeding," Proceedings of 18th Annual ACM-SIAM symposium on Discrete algorithms, 9 pages. Society for Industrial and Applied Mathematics, 2007.

Belkin, M. and Sinha, K. "Polynomial Learning of Distribution Families," Foundations of Computer Science (FOCS), 2010 51st Annual IEEE Symposium, 24 pages. IEEE, Apr. 28, 2010.

Chang, K.L. "Multiple Pass Streaming Algorithms for Learning Mixtures of Distributions in Rd," International Conference on Algorithmic Learning Theory, 16 pages. Elsevier B.V. 2009.

(Continued)

*Primary Examiner* — Giovanna B Colan
(74) *Attorney, Agent, or Firm* — Nicholson De Vos Webster & Elliott LLP

(57) ABSTRACT

Techniques for hotspot detection in a dataset are described. A hotspot being a region (or a collection of points) where the value of a function of given any region in the space measures the concentration of points in that region is significantly higher than its other regions of the dataspace. As such, a region that has a denser concentration of points than other regions of the dataspace may be considered a hotspot. In some implementations, hotspot detection includes finding two or more regions to evaluate for high-density in the dataset, a high-density region indicating a potential hotspot and extending a size of the manipulated found two or more regions to determine borders for these regions.

20 Claims, 13 Drawing Sheets

(56) References Cited

U.S. PATENT DOCUMENTS

| | | | | |
|---|---|---|---|---|
| 7,685,109 | B1* | 3/2010 | Ransil et al. | G06F 16/951 |
| | | | | 707/999.003 |
| 8,756,085 | B1* | 6/2014 | Plummer et al. | G06T 7/187 |
| | | | | 705/40 |
| 9,911,058 | B2* | 3/2018 | Gupta et al. | G06T 7/194 |
| 9,928,661 | B1* | 3/2018 | Kinstner et al. | A63F 13/20 |
| 10,168,768 | B1* | 1/2019 | Kinstner | G06F 3/04847 |
| 10,380,853 | B1* | 8/2019 | Solh et al. | G06V 10/763 |
| 10,394,776 | B2* | 8/2019 | Khan | G16H 50/30 |
| 10,460,485 | B2* | 10/2019 | Wittkopf et al. | G06T 11/206 |
| 2004/0064269 | A1* | 4/2004 | Shibuya et al. | G06T 7/0004 |
| | | | | 702/40 |

OTHER PUBLICATIONS

Charikar, M. and Siminelakis, P. "Hashing-Based-Estimators for Kernal Density in High Dimensions," 58th Annual IEEE Symposium on Foundations of Computer Science, 12 pages. 2017.

Dasgupta, Sanjoy "Learning Mixtures of Gaussians," University of California, Berkeley, IEEE Symposium on Foundations of Computer Science, 12 pages. 1999.

Drineas, P. and Kannan, R. "Pass Efficient Algorithms for Approximating Large Matrices," CS Department, Yale University, 10 pages. 2003.

Ester, Martin, et al., "A Density-Based Algorithm for Discovering Clusters in Large Spatial Databases with Noise," Kdd, volumn 96, 6 pages. 1996.

Figueiredo, M. and Jain, A.K., "Unsupervised Learning of Finite Mixture Models," IEEE Transactions on Pattern Analysis and Machine Intelligence, Vol. 24, No. 3, 16 pages. Mar. 2002.

Goldenshluger, A. and Lepski, O. "On adaptive minimax density estimation on Rd," Probability Theory and Related Fields, " 159(3-4): 52 pages. 2013.

Grbovic, M., et al., "E-commerce in Your Inbox: Product Recommendations at Scale. In Proceedings of the 21th ACM SIGKDD Int'l Conference on Knowledge Discovery and Data Mining, 10 pages, ACM, 2015.

Hsu, D. and Kakade, S.M. "Learning mixtures of spherical Gaussians: moment methods and spectral decompositions," Mircrosoft Research New England, 29 pages, Oct. 2012.

Moitra, A. and Valiant, G. "Settling the Polynomial Learnability of Mixtures of Gaussians," 51st Annual IEEE Symposium on Foundations of Computer Science (FOCS), 43 pages. Apr. 2010.

Parzen, Emanuel "On Estimation of a Probability Density Function and Mode," Technical Report No. 40, Aug. 21, 1961. Applied Mathematics and Statistics Laboratories, Stanford University, Stanford, California. 32 pages. 1961.

Rosenblatt, Murray "Remarks on Some Nonparametric Estimates of a Density Function," Annals of Mathematical Statistics, Vol. 27, Issue 3, 7 pages. Sept. 1956.

Sanjeev, A. and Kannan, R. "Learning mixtures of arbitrary gaussians," Proceedings of the thirty-third annual ACM symposium on Theory of computing, 23 pages. 2001.

\* cited by examiner

| HOTSPOT HISTORY 204 |||
|---|---|---|
| HOTSPOT ID 401 | DIRTINESS 403 | METADATA 405 |
| 1 | 0 | GROWTH RATE, PROPERTIES OF POINTS, ETC. |
| 2 | 3 | ... |

*FIG. 4*

Input: Samples drawn from the mixture distribution $\mathcal{D}$ and positive real numbers $w$, $\eta$, $\epsilon$, and $\delta$.

1. Let $W_1$ be a sample of $64d \log d \log(1/\delta)/(\epsilon^2 \eta)$ points from $\mathcal{D}$, and let $W_2$ be an independent sample of $16d \log(1/\delta)/(\epsilon \eta)$ points from $\mathcal{D}$.
2. Let $S = (S_1, S_2, S_3, \ldots)$ be a random permutation of the set of all $8s \log(1/\delta)$-sized subsets of $W_2$.
3. Let $C$ be an empty set.
4. For each $S_i \in S$
   (a) Let $B$ be the bounding box of the points in $S_i$.
   (b) If $B$ does not span more than $w$ in any dimension, then
      i. Let $B'$ be the stretched version of $B$
      ii. If $B'$ does not contain at least an $\eta/2$ fraction of points from $W_1$, discard $B'$ and continue to the next $S_i$
      iii. For each dimension $i \in [d]$, let $B_i'^L$, and $B_i'^R$ be the two halves of $B'$ attained by splitting at the midpoint of $B'$ along the $i$th dimension.
      iv. For each box $b$ in $\{B'\} \cap \cup_{i \in [d]} \{B_i'^L, B_i'^R\} \ldots$
         A. Let $x$ be the geometric midpoint of $b$.
         B. Let $y$ be the center of mass of $W_1 \cap b$.
         C. If $\|x - y\|_{\infty, B'} > \epsilon d^{-1}/8$ discard $B'$ and continue to the next $S_i$.
      v. If $B'$ has not been discarded, add $B'$ to $C$.
5. Return the largest (volume) box from $C$.

SYSTEMS, METHODS, AND APPARATUS FOR HOTSPOT DETECTION

BACKGROUND

A hotspot is a dense region in dataspace. More concretely, given a set of points in some space and a function that given any region in the space measures the concentration of points in that region, a hotspot is a region (or a collection of points) where the value of the function is significantly higher than other regions of the dataspace. One example of a function that measures concentration is the ratio of the number of points in a region to its volume. As such, a region that has a denser concentration of points than other regions of the dataspace may be considered a hotspot.

BRIEF DESCRIPTION OF DRAWINGS

Various embodiments in accordance with the present disclosure will be described with reference to the drawings, in which:

FIG. 4 illustrates an embodiment of a hotspot history.

FIG. 7 illustrates an embodiment of algorithm for hotspot detection.

DETAILED DESCRIPTION

Figure 1:
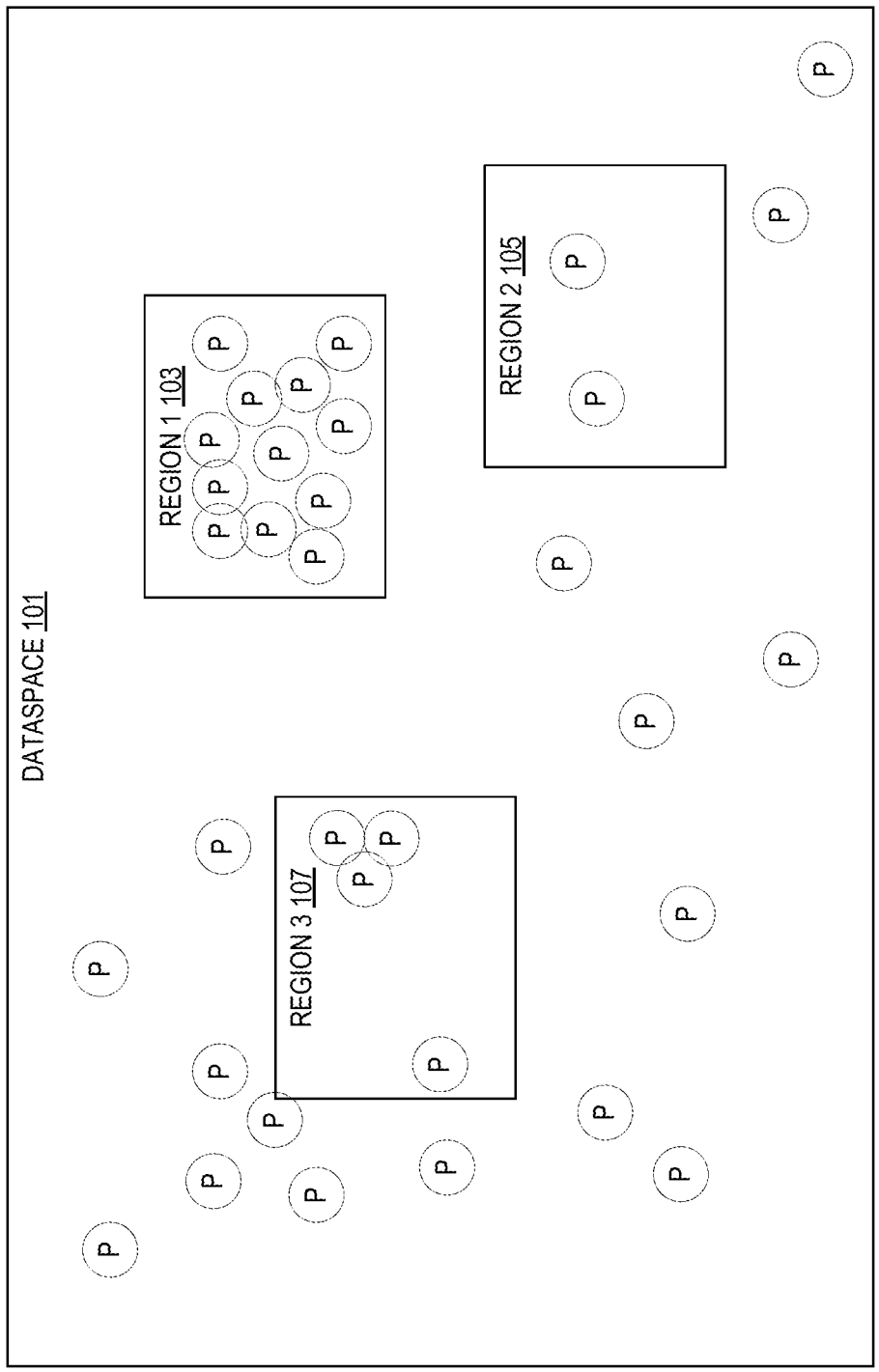
FIG. 1 illustrates an example of a dataspace with a plurality of points.

Various embodiments of methods, apparatus, systems, and non-transitory computer-readable storage media for identifying one or more hotspots in a dataset are described. According to some embodiments, hotspots are detected as points arrive in a data stream. In some embodiments, hotspots are detected by performing space partitioning and then region-expanding.

Detecting hotspots is challenging for multiple reasons: a) the exact definition of hotspot might be context dependent, b) hotspots appear and disappear over time, c) early detection of hotspot is ideal but could be susceptible to noise, and d) space and computationally efficiency matters to support the required data ingestion rate.

The first candidate to solve the hotspot detection problem is the classical k-means algorithm. In brief, this algorithm selects a collection of initial guesses of the cluster centers, and iteratively improves its choice of centers using a simple local search heuristic. k-means++ defines a particularly effective way of initializing the set of guessed centers. In practice, one can think of two drawbacks of using the k-means algorithm for hotspot detection. First, the correct choice of k is far from obvious, and may vary over time. Second, the initialization and local search heuristics used place undue emphasis on being near points far away from truly hot regions. As the fraction of outliers increases, k-means shifts from a cluster-detection algorithm to one that simply tries to tile the noisy space. In the below example, blue points represent taxi pickup locations. The found cluster centers over-respond to the noise, and (with one exceptionally poorly-placed exception) mostly try to tile Manhattan.

Another candidate for detecting hotspots is the Kernel Density Estimation (KDE) method. In the KDE, a truncated Gaussian distribution is placed on top of each input point. The density of any point in the space, then, is the sum of probabilities that it receives from other points. Thus, input points increase the density of nearby points more than those far away. KDE gives a smooth transition from higher density regions to lower density ones and it has a nice graphical representation. However, there are a few issues with KDE. Although computing the density of an individual point can be done in linear time, finding large regions in which every point contains high density is computationally expensive.

Quad-tree space partitioning approaches can also be used for this problem. In quad-tree partitioning, successively finer grids are used on the same plane. Starting from coarsest grid, only cells that are reasonably dense are partitioned into $2^d$ sub-cells of half of the length in each dimension. Eventually, this only places small cells on the very densest regions of the space. The union of these dense regions should roughly cover the hotspots. Quadtree partitioning is data stream friendly. Given the partitioning, one can then try to merge small, dense cells into larger regions that truly define the hotspots.

A different class of algorithms is density-based clustering, with DBSCAN and OPTICS being the two most famous variants. DBSCAN requires as input two parameters, r and k, denoting a radius and point threshold. Each point that has at least k neighbors within distance r is then said to be a core point. An adjacency graph is then computed on the core points, where two points are said to be adjacent if they are within distance r of each other. Finally, one hotspot is output for each connected component in this graph, consisting of both (i) the core points in the connected component and (ii) all non-core points within a distance r of one of the core points in the component. OPTICS behaves similarly, but does not require the parameter r. Instead, r is computed by the algorithm for each point individually. Instead of outputting discrete clusters, OPTICS outputs a "dendogram" which can be cleaved to form hotspots either manually or by thresholding down to "reasonable" values of r.

Finally, there is theoretical work on finding k-histograms in 1-dimensional data, where k intervals are found that are almost uniformly dense. In particular, the goal is to find a collection of k (overlapping) intervals such that the density of each point in the space can be expressed as a weighted sum of each of the k intervals. Unfortunately, these approaches do not generalize well for higher dimensional spaces and are not aware of any efficient streaming algorithm for k histograms in high dimensions.

Each of the above approaches are one step approaches. Embodiments detailed herein address the above deficiencies using at least two steps offering at least one of better resiliency to noise, interpretable shapes, handling of complex shapes, efficiency in high dimensions, linear update time, and fallback for poor parameter choice.

FIG. 1 illustrates an example of a dataspace with a plurality of points. As shown, the dataspace 101 includes a plurality of points (marked as circle P). As shown, there are instances of points that are concentrated into regions. Note that while the regions 103-107 of this figure are shown as 2-D rectangles, any shape or number of dimensions may be used. Further, while some points are not shown as a part of a region that does not mean that they are not a part of one or more regions. What is shown is merely illustrative.

Region 2 105 contains two points, region 3 107 includes four points, and region 1 103 includes twelve points. Relatively speaking, region 2 105 is less dense than either region 1 103 or region 3 107, and region 1 103 has significantly (relatively) more points than the other regions 105, 107. As such, region 1 103 is a hotspot.

Figure 2:
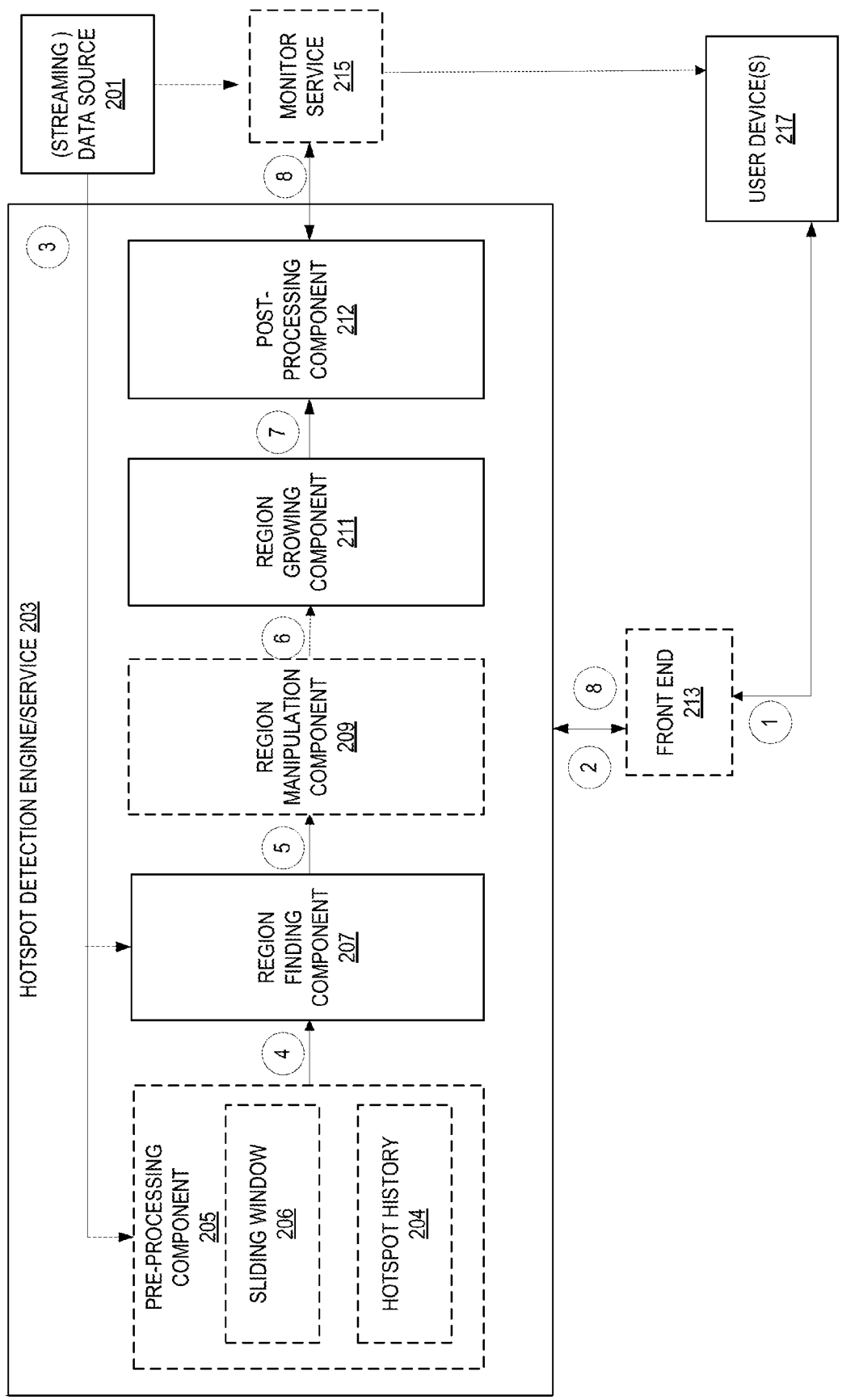
FIG. 2 illustrates embodiments of a system for detecting hotspots in data as a service.

FIG. 2 illustrates embodiments of a system for detecting hotspots in data as a service. A data source 201 provides data (such as a dataset or updates to a dataset) to a hotspot detection engine or service 203 which is a part of a web services (provider network) offering. For example, in some embodiments, the data source 201 provides streaming data as it is produced to the hotspot detection engine or service 203. In other embodiments, the data source 201 is a storage location such as a database in a hosted processing environment, or a database accessible to a hosted processing environment. Examples of a data source 201 include, but are not limited to: a part of a server (e.g., a virtual network of devices within a web services provider), one or more edge devices (e.g., a phone, camera, sensors, etc.), an aggregation of data sources (such as an aggregation of edge devices), etc. In some embodiments, the hotspot detection engine or service 203 is stored as code to be executed by a processor.

The hotspot detection engine or service 203 includes a region finding component 207, a region growing component 211, and a post-processing component 212.

The region finding component 207 performs by region finding of a dataspace by splitting the dataspace (such as dataspace 101) into components that can be scanned for high density (but not necessarily maximally-sized) regions. The splitting may be performed by one of many techniques including, but not limited to: using bounding boxes generated by a space partitioning data structure and its higher-dimensional equivalents including, in some embodiments, walking the space partitioning data structure to find a larger bounding box of appropriate density; using random sampling of pairs of opposite corners to define bounding boxes; using the Voronoi cells of a diagram generated by a clustering algorithm; and using the space partitions implicitly generated by a Locality Sensitive Hashing scheme.

In some embodiments, pre-processing of the data of the data source 201 is performed by pre-processing component 205 prior to region finding. Pre-processing sanitizes and/or otherwise manipulates the dataspace to improve running time or avoid pathological corner cases. Embodiments of pre-processing steps include, but are not limited to: sub-sampling input points which preempts computation entirely on a random subset of the data; eliminating anomalous points (for example, as determined by a Robust Random Cut Forest data structure or otherwise) that are unlikely to fall near true hotspots; and randomly rotating the space (or more generally, applying a consistent unitary transform of the data) to mitigate the risk of data lying on an axis-aligned hyperplane.

In some embodiments, for example when handling streaming data, a sliding window is used. For some fixed parameter n, a sliding window 206 of the last n points is maintained. Bounding the number of points ensures that potentially currently-active hotspots are evaluated and lowers the amount of re-computation required for each new point that arrives.

In practice, changing one point of a very large hotspot is not likely to have a substantial effect on the shape of the hotspot. Further, a point is not likely to have any effect on the detection or growth of a hotspot far away from it. In some embodiments, for example when handling streaming data, for each hotspot, a hotspot history 204 is maintained. In the hotspot history 204 a dirtiness parameter per hotspot is kept and these parameters indicate the urgency of recomputing the hotspot from scratch. Upon an initial computation, the dirtiness of a hotspot is set to 0. When a point falls or disappears from the vicinity of a hotspot, the dirtiness of the hotspot is increased (for example by 1). For every hotspot h, as long as hotspot's dirtiness remains below ε|h| (where |h| denotes the number of points in the hotspot and ε is a global parameter), it is assumed that any previous hotspot identical to that which computed h would again grow to the exact same value. As such, the region-growing phase for any region or hotspot corresponding to a sufficiently non-dirty hotspot is pre-empted. As large hotspots are the main source of slow computation, this technique improves the amortized time of each seed-growing step from quadratic in the window size to linear. This also works to stabilize the output, ensuring that large hotspots give the same output for sequences of point modifications.

FIG. 4 illustrates an embodiment of a hotspot history 204. As shown, per hotspot, there is a hotspot identifier 401 and a dirtiness value 403 as detailed above. Additionally, in some embodiments, the hotspot history 204 includes metadata 405 about the hotspots. For example, metadata 405 may include a growth or decay rate of a hotspot, properties of points of the hotspot (such as a feature vector detailing information about the points), etc. Information about a point may include, for example, information about a person a point represents (such as demographic information), information about a device a point represents (such as operating system, hardware, etc.), information about a product (product vector embeddings), etc. In some embodiments, hotspot metadata 405 is stored in a different data structure.

The output of the region finding component 207 may be consumed by one of a region manipulation component 209 (in some embodiments) or the region growing component 211. The manipulation component 209 manipulates the collection of regions found to minimize the regions to evaluate by performing tasks including, but not limited to: eliminating low-density seeds; when the seeds were extracted from a hierarchical data structure (such as Quad Tree or RRCF), replacing the seeds with any ancestor entities that exhibit a better size-density trade-off; and sorting the region set either by density or according to a size-density trade-off.

The region growing component 211 operates on either manipulated regions or directly on the regions output from the region finding component 207. Region finding is on its own not guaranteed to capture the full extent of a hotspot. The region growing component 211 extends the size of the found regions. Embodiments of extending the size of found regions include, but are not limited to: sweeping by stretching a bounding polygon of a region iteratively along each of its faces as long as doing so does not decrease the density of the enclosed region by more than a prescribed quantity; and influence spreading in which all points within a distance r of at least k different points in the region are themselves added to the region (with k and r being global parameters). The influence spreading is repeated as long as there exists some point that the procedure may add to the region, even if it had fewer than k points within distance r in the initial state of the region. In some embodiments, influence spreading includes maintaining a "neighborhood graph" on the input points, with an edge connecting two points whenever they lie within a distance r of each other (for some parameter r).

The post-processing component 212 manipulates the collection of grown regions prior to outputting them as a collection of hotspots. In some embodiments, the post-processing component 212 performs one or more of: sanity-checking the candidate hotspots to ensure that they have sufficient density; undoing any rotation/transformation that might have occurred in pre-processing; eliminating hotspot overlap either by merging hotspots or by discarding hotspots of lower density; and/or fitting a simple shape to the discovered hotspots to make output more interpretable.

In some embodiments, a monitor service 215 takes the results of the detection and presents them to the user. For example, the monitor service 215 provides an interface showing hotspots on a map, etc.

In some embodiments, the hotspot detection is provided as a part of a web services offering, and a front end 213 is used to configure the hotspot detection engine or service 203 using a user device 217. In some embodiments, the front end 213 and the monitor service 215 are combined.

In most embodiments, the front end 213, the monitor service 215, and the hotspot detection engine or service 203 are software executing on one or more processors. For example, in some embodiments, this software is a part of a web services offering. Additionally, while the hotspot detection engine or service 203 is shown as comprising separate components, in some embodiments, one or more of these components are combined.

FIG. 2 illustrates circles with numbers in them to denote actions. At circle 1, in some embodiments, a user device 217 provides a request for the hotspot detection engine or service 203 via the front end 213. For example, a request is generated via a user device 217 to configure the hotspot detection engine or service 203 to operate in a particular manner. A request may include one or more of: an identifier of a data source (such as a database location or an identifier of a streaming source); an identifier of which techniques to utilize for pre-processing, region find, region manipulation, region growing, and post-processing; an indication of how an output is to be presented; and an indication of how many times (or for how long) hotspot detection is to be performed (for example, looking at streaming data for 30 minutes). In some embodiments, the identifier of which techniques to utilize comes in the form of a selection of one or more configurable algorithms. For example, a configuration may indicate to use bounding boxes generated by the Quad Tree data structure and its higher-dimensional equivalents wherein the hotspot detection engine or service 203 includes, or has access, to code to enable this functionality. In some embodiments, an identification of where to find code to perform these techniques is provided. In some embodiments, the code itself is provided as a part of the request.

At circle 2, in some embodiments, these components are configured as requested.

The data source(s) 201 provide data at circle 3 to the hotspot detection engine or service 203. This may be in the form of streaming data, or as a static dataset. Depending on the embodiment, the dataset is provided to the pre-processing component 205 or the region finding component 207.

When the dataset is provided to the pre-processing component 205, pre-processing as described above is performed and the output of the pre-processing component 205 is provided to the region finding component 207 at circle 4.

The region finding component at 207 uses the output provided at circle 4 or input of circle 3 to find one or more regions as detailed above. The found one or more regions are output at circle 5 to the region manipulation component 209 in some embodiments.

The region manipulation component 209, when used, manipulates the collection of regions found and provides the manipulated region information to the region growing component 211 at circle 6.

The region growing component at 211 uses the output provided at circle 5 or 6 depending on the implementation to extend the size of the found regions and outputs the resulting sized regions at circle 7.

The post-processing component 212 manipulates the sized regions as noted above and provides a result to either a monitor service 215 or the front end 213 at circle 8. A user device 217 may accesses the output via the monitor service 215 or front end 213 depending upon the implementation.

Figure 3:
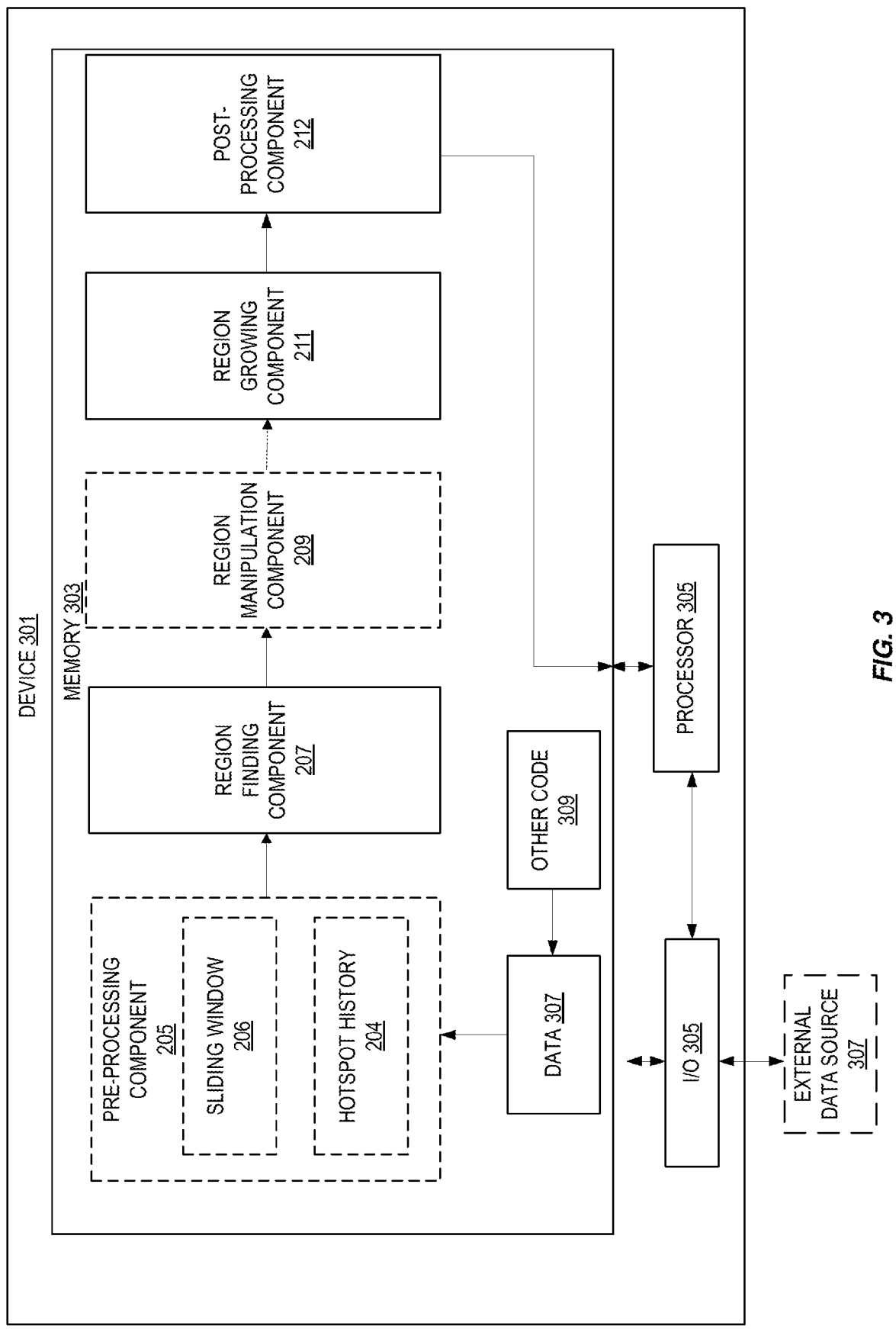
FIG. 3 illustrates embodiments of a device for detecting hotspots in data.

FIG. 3 illustrates embodiments of a device for detecting hotspots in data. The device 301 includes memory 303 to store the components detailed above for the hotspot detection engine or service 203 and also to store the dataset 307 to operate on.

The memory 303 is coupled to a processor 305 which executes the components 204-212. The memory 303 is also coupled to input/output mechanisms 305 (such as an interconnect for a keyboard, mouse, display) either directly or via the processor 305.

In some embodiments, an external data source 307 provides the dataset. In other embodiments, the dataset is generated internally bye other code 309.

Figure 5:
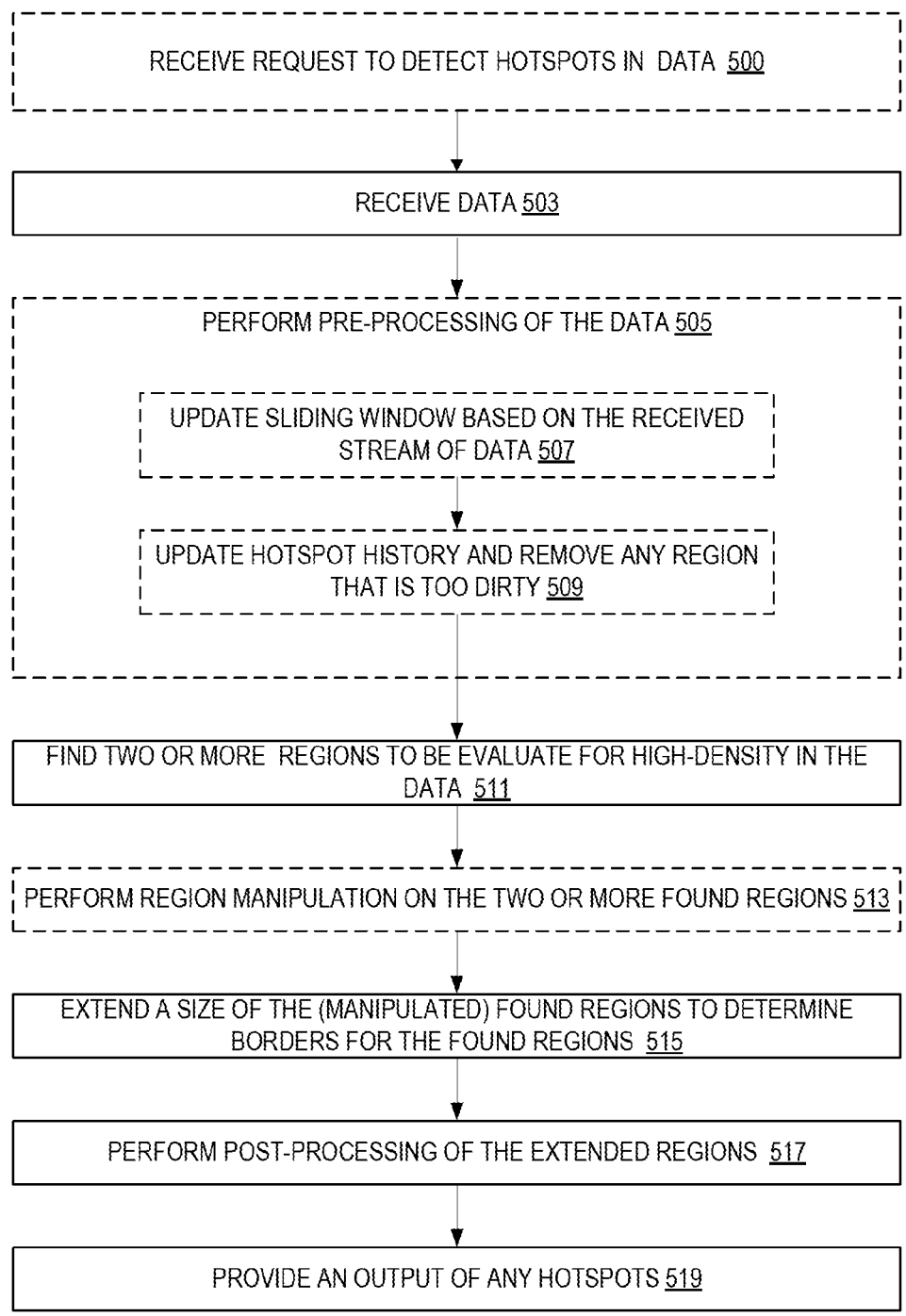
FIG. 5 illustrates embodiments of a method for hotspot detection.

FIG. 5 illustrates embodiments of a method for hotspot detection. In particular, embodiments of this method are performed by hotspot detection engine or service, or within a device having components similar to that of a hotspot detection engine or service.

In some embodiments, at 501, a request to detect hotspots in a dataset is received. For example, in a provider network, a request to detect hotspots is received via a front end. The request includes parameters to be applied by a hotspot detection engine or service, or device. Examples of such parameters have been detailed above.

The dataset to evaluate is received at 501. In some embodiments, this is a batch of data. In other embodiments, the dataset comes from a streaming data source.

In some embodiments, pre-processing of the dataset is performed at 507. Pre-processing, generally speaking, attempts to minimize computation or running time. In some embodiments, this is performed by the pre-processing component 205. When hotspots are to be detected in a streaming data set, each new point is collected as it comes in. In some embodiments, each new point triggers a revaluation. In other embodiments, more than one new point is required. Regardless of which approach is utilized, in some embodiments, a sliding window of what to evaluate is updated at 507. In some embodiments, a hotspot history is updated at 509. The use of a sliding window and/or a hotspot history should help pre-empt unnecessary effort. In some embodiments, this is performed by the pre-processing component 205.

At 511, two or more regions are found in the dataset to be evaluated for high-density of points. In some embodiments, this is performed by the region finding component 207. These regions are hotspot seeds in that they may be hotspots, but are worth evaluating to be certain.

In some embodiments, the two or more found regions are manipulated to minimize the regions to evaluate at 513. This may be performed by the region manipulation component 209.

The size of (manipulated) regions are extended to find borders for the found regions at 515. This extension should minimize the number of overlapping hotspots and/or merge closely neighboring points into an existing region. In some embodiments, this is performed by the region growing component 211.

Post-processing is performed on the extended region(s) to determine which of the extended regions are hotpots at 517. Post-processing manipulates the collection of grown regions prior to outputting them as a collection of hotspots. For example, are the hotspots really hotspots? In some embodiments, this is performed by the post-processing component 212.

An output of any determined hotspots is provided at 519. This output is made available to a user or program for further use. In some embodiments, the output includes information about the points that make up the hotspot. For example, metadata such as that described with respect to metadata 405 is output. This additional information may be useful in deciding how to act based on a particular hotspot.

FIG. 7 illustrates an embodiment of pseudocode for an algorithm for hotspot detection. A sliding window of rotated points is maintained; the algorithm's hotspots are derived from the points in this window. When the window becomes full, we use a robust random cut tree data structure to partition the space and determine candidate seeds. Seeds are discarded if they intersect an already-found hotspot; otherwise, the random cut tree is walked to find larger regions of similar density, and then the found regions are grown through an influence-spreading approach. When the candidate seeds are exhausted, the set of discovered hotspots are returned, with all contained points un-rotated back into their original positions.

Figure 6:
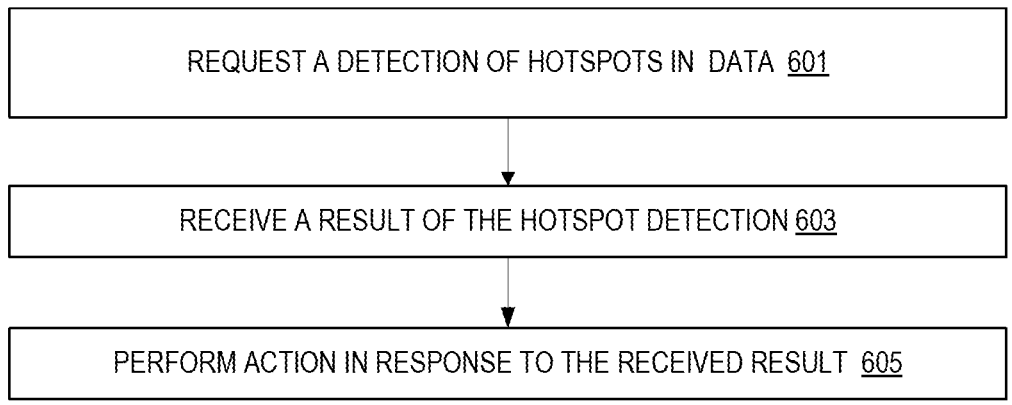
FIG. 6 illustrates embodiments of a method for hotspot detection usage.

FIG. 6 illustrates embodiments of a method for hotspot detection usage. For example, a user device is used to request hotspot detection on a dataset and then one or more actions are caused to be performed by the user device (or one or more devices communicating with the user device).

At 601, a request for hotspot detection is sent to a network provider (such as a web services provider). Examples of content for such a request have been detailed.

Results of the hotspot detection are received at 603. For example, the network provider may send determined hotspots to the user device, or make the determined hotspots available. In some embodiments, the results include information about the points that make up the hotspot.

Some action is performed in response to the received result at 605. There are many actions that may be taken based on hotspot detection. Ride-hailing services may use hotspots to divert their driving resources to those hotspots. Early detection of hotspots, especially non-periodic ones, are helpful. Autonomous vehicles may use hotspots to detect hazardous conditions such as traffic issues (collections of stopped cars due to traffic or road hazards), localized weather issues (for example, use an aggregation of windshield wiper rates to detect areas with heavy rain), etc. Commerce entities may use hotspot detection to find points (products in the catalog) that exhibit a spike in orders, reviews, or some other characteristic over time. Medical entities may use hotspots to measure and map brain activity (functional magnetic resonance imaging or fMRI). Weather entities may use data from sensors to generate data streams that can be used to detect hotspot weather patterns such as forest fires, hurricanes, floods, etc.

Figure 8:
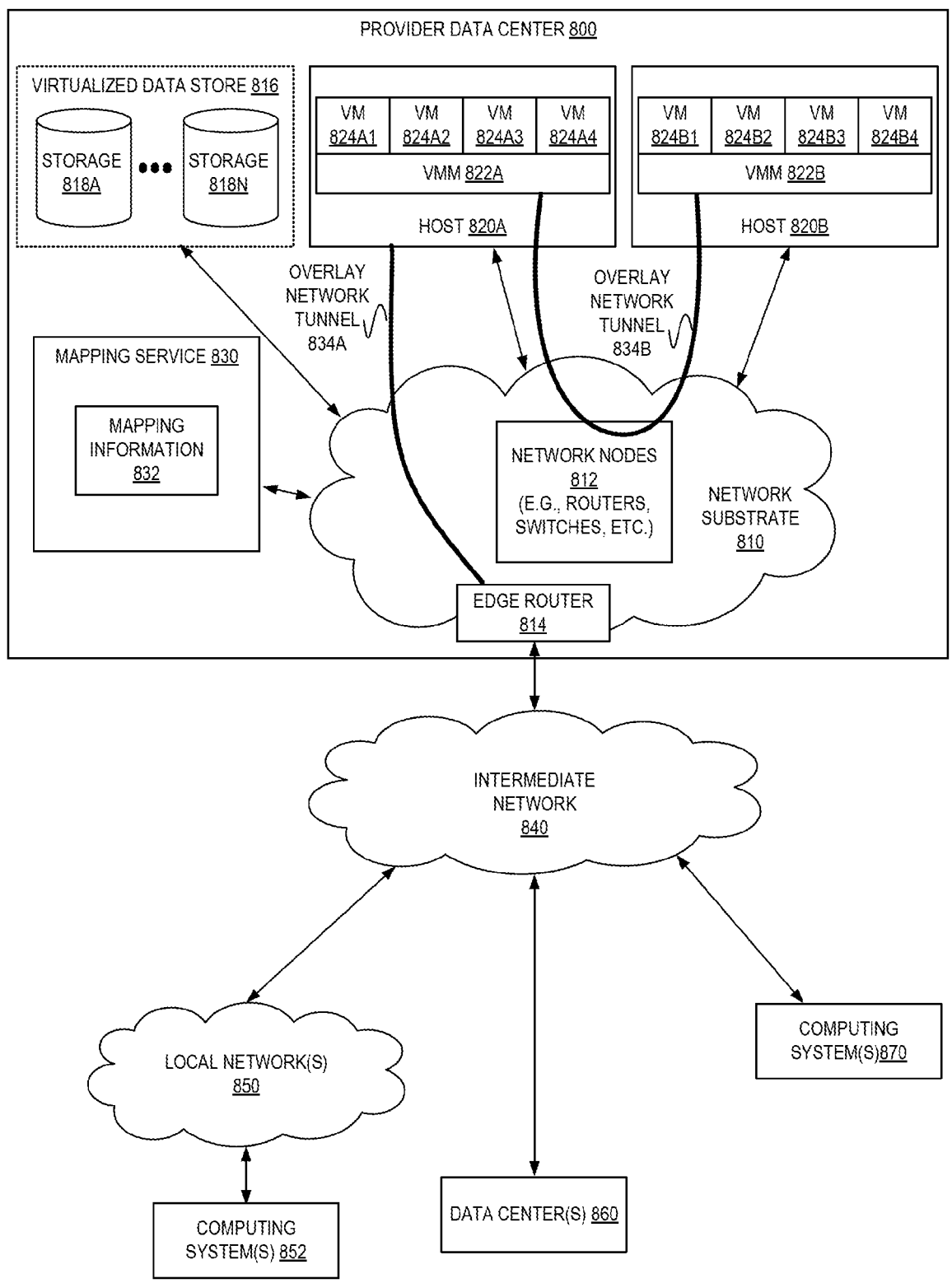
FIG. 8 illustrates an example data center that implements an overlay network on a network substrate using IP tunneling technology according to some embodiments.

FIG. 8 illustrates an example data center that implements an overlay network on a network substrate using IP tunneling technology, according to some embodiments. A provider data center 800 may include a network substrate that includes networking nodes 812 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 810 using tunnels. The IP tunneling technology may provide a mapping and encapsulating system for creating an overlay network on a network (e.g., a local network in data center 800 of FIG. 8) and may provide a separate namespace for the overlay layer (the public IP addresses) and the network substrate 810 layer (the local IP addresses). Packets in the overlay layer may be checked against a mapping directory (e.g., provided by mapping service 830) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 830) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 8, an example overlay network tunnel 834A from a virtual machine (VM) 824A (of VMs 824A1-824A4, via VMM 822A) on host 820A to a device on the intermediate network 850 and an example overlay network tunnel 834B between a VM 824A (of VMs 824A1-824A4, via VMM 822A) on host 820A and a VM 824B (of VMs 824B1-824B4, via VMM 822B) on host 820B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 8, at least some networks in which embodiments may be implemented may include hardware virtualization technology that enables multiple operating systems to run concurrently on a host computer (e.g., hosts 820A and 820B of FIG. 8), i.e. as virtual machines (VMs) 824 on the hosts 820. The VMs 824 may, for example, be executed in slots on the hosts 820 that are rented or leased to customers of a network provider. A hypervisor, or virtual machine monitor (VMM) 822, on a host 820 presents the VMs 824 on the host with a virtual platform and monitors the execution of the VMs 824. Each VM 824 may be provided with one or more local IP addresses; the VMM 822 on a host 820 may be aware of the local IP addresses of the VMs 824 on the host. A mapping service 830 may be aware of (e.g., via stored mapping information 832) network IP prefixes and IP addresses of routers or other devices serving IP addresses on the local network. This includes the IP addresses of the VMMs 822 serving multiple VMs 824. The mapping service 830 may be centralized, for example on a server system, or alternatively may be distributed among two or more server systems or other devices on the network. A network may, for example, use the mapping service technology and IP tunneling technology to, for example, route data packets between VMs 824 on different hosts 820 within the data center 800 network; note that an interior gateway protocol (IGP) may be used to exchange routing information within such a local network.

In addition, a network such as the provider data center 800 network (which is sometimes referred to as an autonomous system (AS)) may use the mapping service technology, IP tunneling technology, and routing service technology to route packets from the VMs 824 to Internet destinations, and from Internet sources to the VMs 824. Note that an external gateway protocol (EGP) or border gateway protocol (BGP) is typically used for Internet routing between sources and destinations on the Internet. FIG. 8 shows an example provider data center 800 implementing a network that provides resource virtualization technology and that provides full Internet access via edge router(s) 814 that connect to Internet transit providers, according to some embodiments. The provider data center 800 may, for example, provide customers the ability to implement virtual computing systems (VMs 824) via a hardware virtualization service and the ability to implement virtualized data stores 816 on storage resources 818A-818N via a storage service.

The data center 800 network may implement IP tunneling technology, mapping service technology, and a routing service technology to route traffic to and from virtualized resources, for example to route packets from the VMs 824 on hosts 820 in data center 800 to Internet destinations, and from Internet sources to the VMs 824. Internet sources and destinations may, for example, include computing systems 870 connected to the intermediate network 840 and computing systems 852 connected to local networks 850 that connect to the intermediate network 840 (e.g., via edge router(s) 814 that connect the network 850 to Internet transit providers). The provider data center 800 network may also route packets between resources in data center 800, for example from a VM 824 on a host 820 in data center 800 to other VMs 824 on the same host or on other hosts 820 in data center 800.

A service provider that provides data center 800 may also provide additional data center(s) 860 that include hardware virtualization technology similar to data center 800 and that may also be connected to intermediate network 840. Packets may be forwarded from data center 800 to other data centers 860, for example from a VM 824 on a host 820 in data center 800 to another VM on another host in another, similar data center 860, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 818A-818N, as virtualized resources to customers of a network provider in a similar manner.

Figure 9:
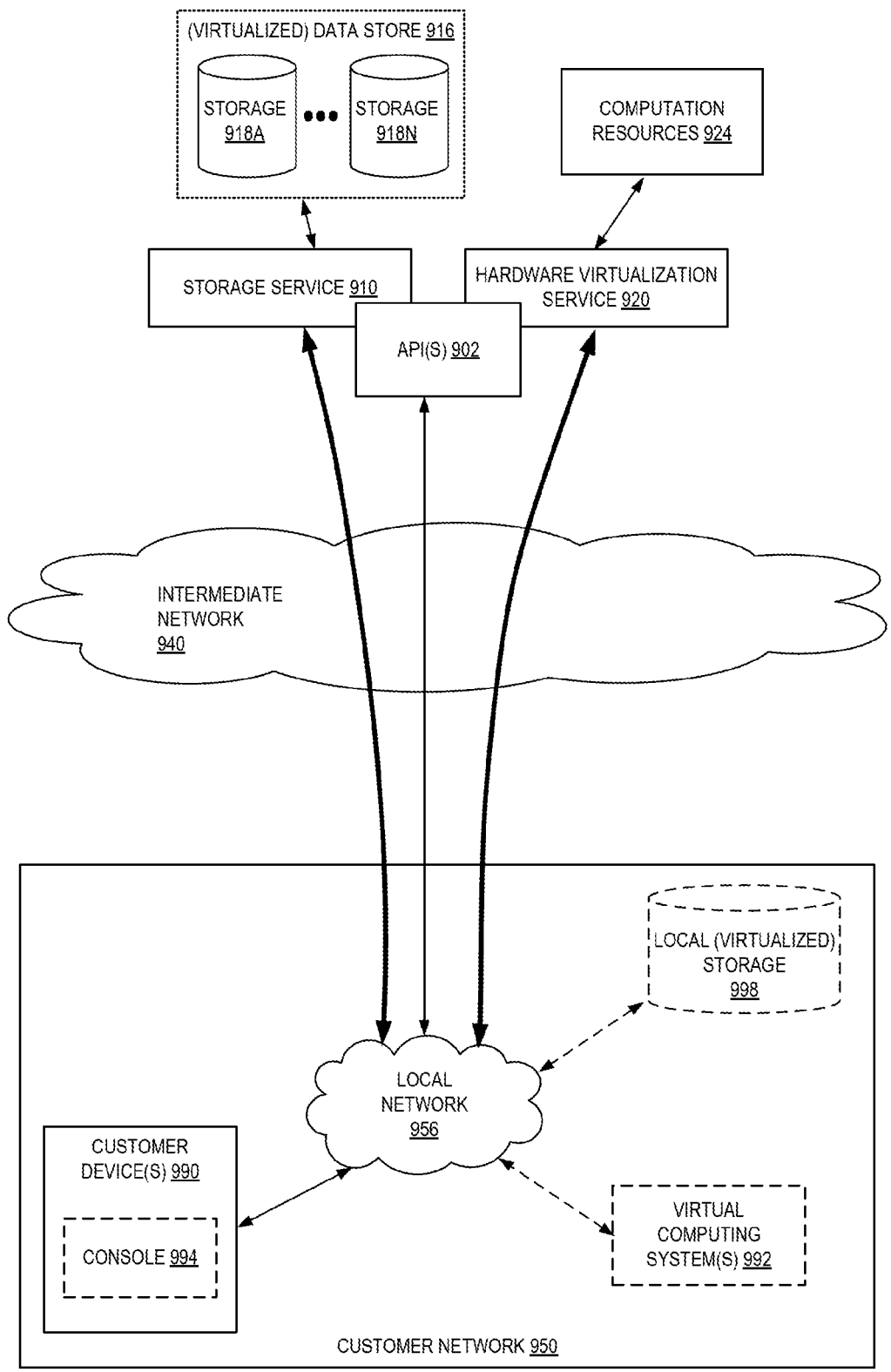
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
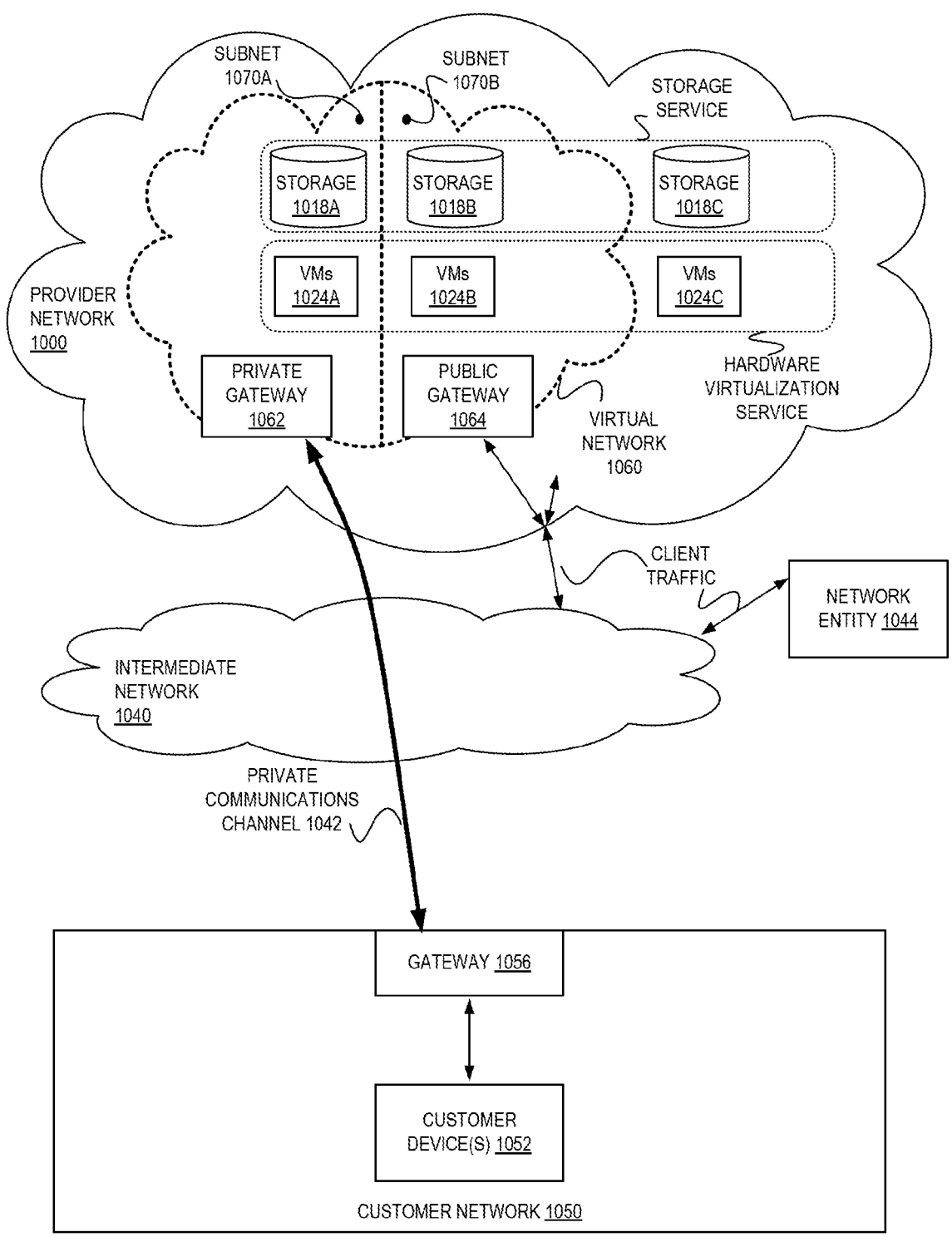
FIG. 10 illustrates an example provider network that provides virtual networks on the provider network to at least some customers according to some embodiments.

FIG. 10 illustrates an example provider network that provides virtual networks on the provider network to at least some customers, according to some embodiments. A customer's virtual network 1060 on a provider network 1000, for example, enables a customer to connect their existing infrastructure (e.g., one or more customer devices 1052) on customer network 1050 to a set of logically isolated resource instances (e.g., VMs 1024A and 1024B and storage 1018A and 1018B), and to extend management capabilities such as security services, firewalls, and intrusion detection systems to include their resource instances.

A customer's virtual network 1060 may be connected to a customer network 1050 via a private communications channel 1042. A private communications channel 1042 may, for example, be a tunnel implemented according to a network tunneling technology or some other technology over an intermediate network 1040. The intermediate network may, for example, be a shared network or a public network such as the Internet. Alternatively, a private communications channel 1042 may be implemented over a direct, dedicated connection between virtual network 1060 and customer network 1050.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 1060 for a customer on provider network 1000, one or more resource instances (e.g., VMs 1024A and 1024B and storage 1018A and 1018B) may be allocated to the virtual network 1060. Note that other resource instances (e.g., storage 1018C and VMs 1024C) may remain available on the provider network 1000 for other customer usage. A range of public IP addresses may also be allocated to the virtual network 1060. In addition, one or more networking nodes (e.g., routers, switches, etc.) of the provider network 1000 may be allocated to the virtual network 1060. A private communications channel 1042 may be established between a private gateway 1062 at virtual network 1060 and a gateway 1056 at customer network 1050.

In some embodiments, in addition to, or instead of, a private gateway 1062, virtual network 1060 may include a public gateway 1064 that enables resources within virtual network 1060 to communicate directly with entities (e.g., network entity 1044) via intermediate network 1040, and vice versa, instead of or in addition to via private communications channel 1042.

Virtual network 1060 may be, but is not necessarily, subdivided into two or more subnetworks, or subnets, 1070. For example, in implementations that include both a private gateway 1062 and a public gateway 1064, a virtual network 1060 may be subdivided into a subnet 1070A that includes resources (VMs 1024A and storage 1018A, in this example) reachable through private gateway 1062, and a subnet 1070B that includes resources (VMs 1024B and storage 1018B, in this example) reachable through public gateway 1064.

The customer may assign particular customer public IP addresses to particular resource instances in virtual network 1060. A network entity 1044 on intermediate network 1040 may then send traffic to a public IP address published by the customer; the traffic is routed, by the provider network 1000, to the associated resource instance. Return traffic from the resource instance is routed, by the provider network 1000, back to the network entity 1044 over intermediate network 1040. Note that routing traffic between a resource instance and a network entity 1044 may require network address translation to translate between the public IP address and the local IP address of the resource instance.

Some embodiments may allow a customer to remap public IP addresses in a customer's virtual network 1060 as illustrated in FIG. 10 to devices on the customer's external network 1050. When a packet is received (e.g., from network entity 1044), the network 1000 may determine that the destination IP address indicated by the packet has been remapped to an endpoint on external network 1050 and handle routing of the packet to the respective endpoint, either via private communications channel 1042 or via the intermediate network 1040. Response traffic may be routed from the endpoint to the network entity 1044 through the provider network 1000, or alternatively may be directly routed to the network entity 1044 by the customer network 1050. From the perspective of the network entity 1044, it appears as if the network entity 1044 is communicating with the public IP address of the customer on the provider network 1000. However, the network entity 1044 has actually communicated with the endpoint on customer network 1050.

While FIG. 10 shows network entity 1044 on intermediate network 1040 and external to provider network 1000, a network entity may be an entity on provider network 1000. For example, one of the resource instances provided by provider network 1000 may be a network entity that sends traffic to a public IP address published by the customer.

Figure 11:
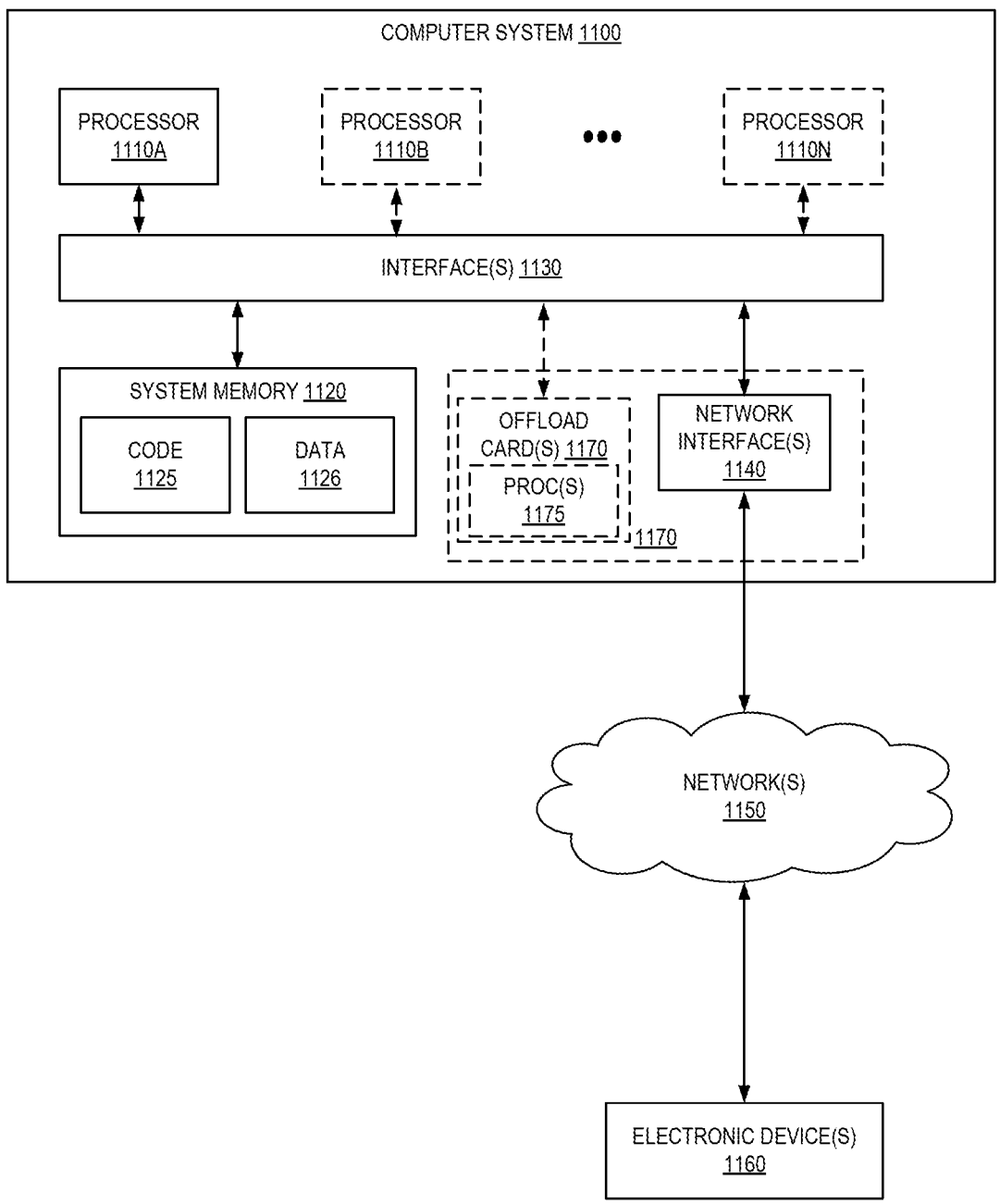
FIG. 11 is a block diagram illustrating an example computer system that may be used in some embodiments.

In some embodiments, a system that implements a portion or all of the techniques for hotspot detection as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments[BL1], a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect - Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Figure 12:
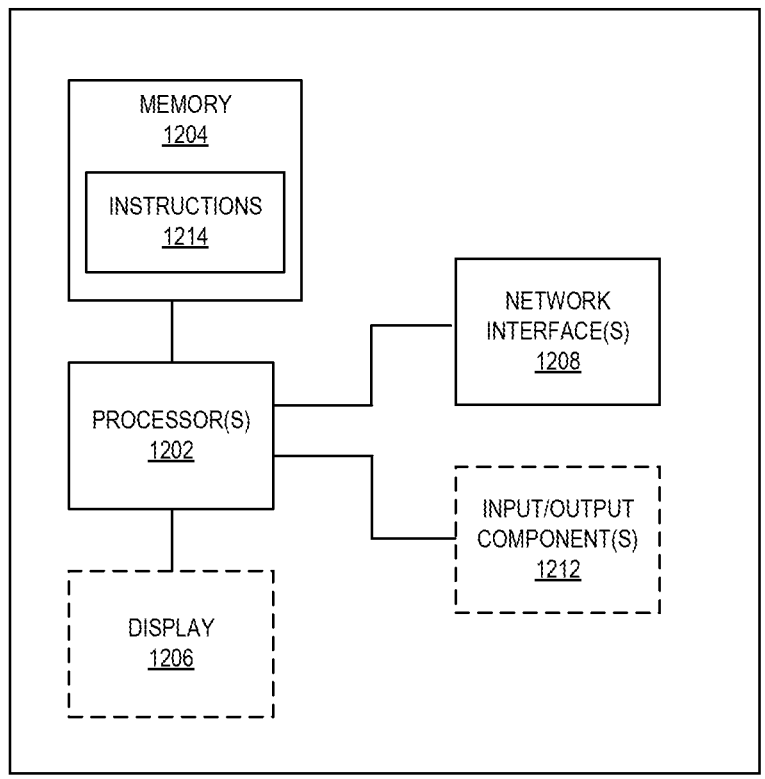
FIG. 12 illustrates a logical arrangement of a set of general components of an exemplary computing device that can be utilized in accordance with various embodiments.

FIG. 12 illustrates a logical arrangement of a set of general components of an example computing device 1200 such as that which executes a hotspot detection engine/service, etc. Generally, a computing device 1200 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1202 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1204) to store code (e.g., instructions 1214) and/or data, and a set of one or more wired or wireless network interfaces 1208 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1204) of a given electronic device typically stores code (e.g., instructions 1214) for execution on the set of one or more processors 1202 of that electronic device. One or more parts of various embodiments may be implemented using different combinations of software, firmware, and/or hardware.

A computing device 1200 can include some type of display element 1206, such as a touch screen or liquid crystal display (LCD), although many devices such as portable media players might convey information via other means, such as through audio speakers, and other types of devices such as server end stations may not have a display element 1206 at all. As discussed, some computing devices used in some embodiments include at least one input and/or output component(s) 1212 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 13:
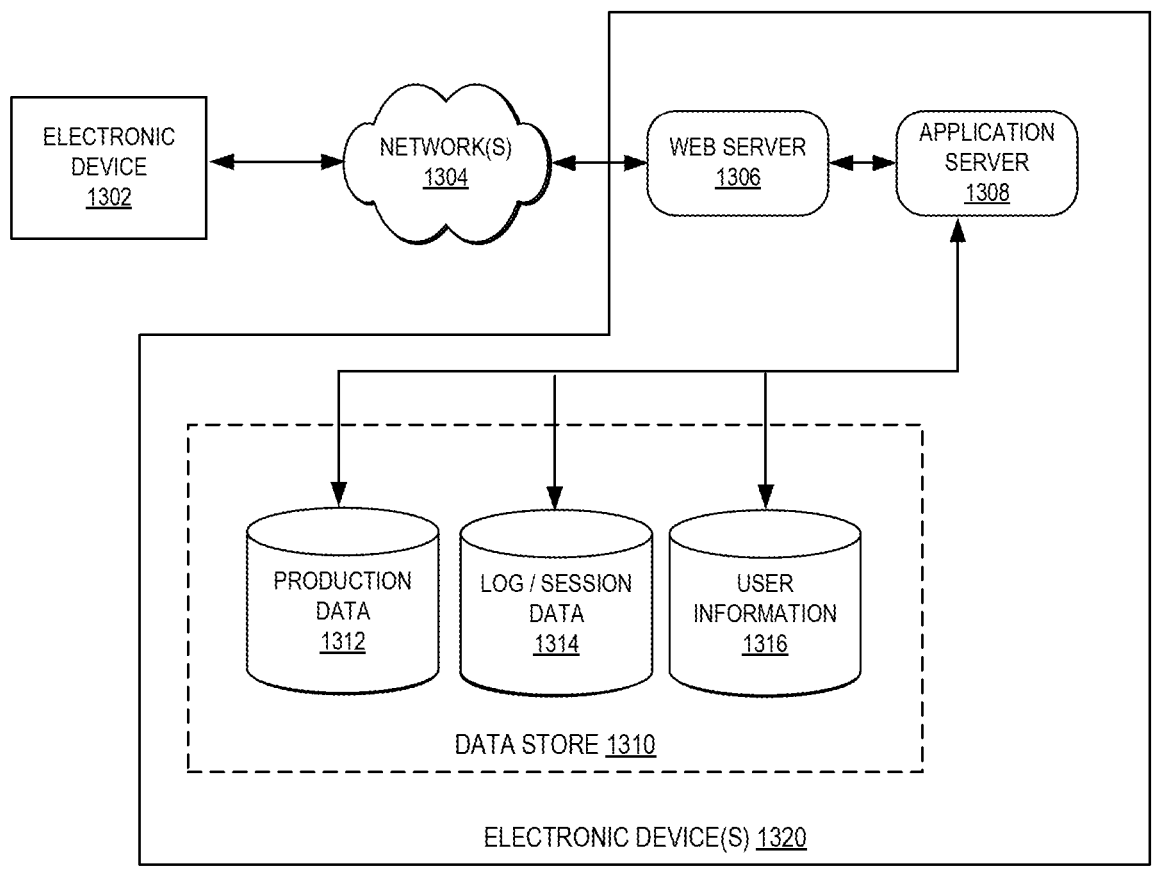
FIG. 13 illustrates an example of an environment for implementing aspects in accordance with various embodiments.

As discussed, different approaches can be implemented in various environments in accordance with the described embodiments. For example, FIG. 13 illustrates an example of an environment 1300 for implementing aspects in accordance with various embodiments. For example, in some embodiments hotspot detection requests are HyperText Transfer Protocol (HTTP) requests that are received by a web server (e.g., web server 1306), and the users, via electronic devices, may interact with the provider network via a web portal provided via the web server 1306 and application server 1308. As will be appreciated, although a web-based environment is used for purposes of explanation, different environments may be used, as appropriate, to implement various embodiments. The system includes an electronic client device 1302, which may also be referred to as a client device and can be any appropriate device operable to send and receive requests, messages or information over an appropriate network 1304 and convey information back to a user of the device 1302. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1304 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1304 includes the Internet, as the environment includes a web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device 1302 and handling a majority of the data access and business logic for an application. The application server 1308 provides access control services in cooperation with the data store 1310 and is able to generate content such as text, graphics, audio, video, etc., to be transferred to the client device 1302, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1302 and the application server 1308, can be handled by the web server 1306. It should be understood that the web server 1306 and application server 1308 are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store 1310 also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store 1310 might access the user information 1316 to verify the identity of the user and can access a production data 1312 to obtain information about items of that type. The information can then be returned to the user, such as in a listing of results on a web page that the user is able to view via a browser on the user device 1302. Information for a particular item of interest can be viewed in a dedicated page or window of the browser.

The web server 1306, application server 1308, and/or data store 1310 may be implemented by one or more electronic devices 1320, which can also be referred to as electronic server devices or server end stations, and may or may not be located in different geographic locations. Each of the one or more electronic devices 1320 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request from a requester to detect hotspots in a dataset;
performing hotspot detection on the dataset by:
finding two or more regions having multiple data points to evaluate for high-density in the dataset, a high-density region indicating a potential hotspot;
manipulating the found two or more regions to lessen a number of regions to be considered as hotspots;
extending a size of the manipulated found two or more regions to determine borders for these regions;
post-processing of the extended regions to determine which of the extended regions are detected hotspots; and
providing an output indicating any detected hotspot to the requester and information about points in any detected hotspot.

2. The computer-implemented method of claim 1, wherein the dataset is generated from a streaming data source and pre-processing the dataset by updating a sliding window of data points to add one or more arriving points to include in hotspot detection and remove one or more points to include in hotspot detection.

3. The computer-implemented method of claim 1, wherein the dataset is generated from a streaming data source and pre-processing the dataset by updating a hotspot history data structure and removing any region from further evaluation that has had a threshold number of points fall from a vicinity of the region.

4. A computer-implemented method comprising:
performing hotspot detection on a dataset by:
finding two or more regions having multiple data points to evaluate for high-density in the dataset, a high-density region indicating a potential hotspot;
extending a size of the found two or more regions to determine borders for these regions;
post-processing of the extended regions to determine which of the extended regions are detected hotspots; and
providing an output indicating any detected hotspot to a requester.

5. The computer-implemented method of claim 4, further comprising:
receiving a request from a requester to detect hotspots in a dataset.

6. The computer-implemented method of claim 5, wherein the requests includes one or more of: an identifier of a data source; an identifier of which techniques to utilize for finding, extending, and post-processing; an indication of how the output is to be presented; and an indication of how many times hotspot detection is to be performed.

7. The computer-implemented method of claim 4, wherein the dataset is generated from a streaming data source and pre-processing the dataset by updating a hotspot history data structure and removing any region from further evaluation that has had a threshold number of points fall from a vicinity of the region.

8. The computer-implemented method of claim 4, wherein the dataset is generated from a streaming data source and pre-processing the dataset by updating a sliding window of data points to add one or more arriving points to include in hotspot detection and remove one or more points to include in hotspot detection.

9. The computer-implemented method of claim 8, wherein finding two or more regions to evaluate for high-density in the dataset, a high-density region indicating a potential hotspot comprises one or more of:
using bounding boxes generated by a space partitioning data structure and its higher-dimensional equivalents including walking the space partitioning data structure to find a larger bounding box of appropriate density;
using random sampling of pairs of opposite corners to define bounding boxes;
using the Voronoi cells of a diagram generated by a clustering algorithm; and
using the space partitions implicitly generated by a Locality Sensitive Hashing scheme.

10. The computer-implemented method of claim 4, wherein extending a size of the manipulated found two or more regions to determine borders for these regions comprises one or more of:
stretching a bounding polygon of a region iteratively along each of its faces as long as doing so does not decrease the density of the enclosed region by more than a prescribed quantity; and
influencing spreading in which all points within a distance r of at least k different points in the region are themselves added to the region.

11. The computer-implemented method of claim 4, further comprising:

manipulating the found two or more regions to lessen a number of regions to be considered as hotspots.

12. The computer-implemented method of claim 11, further comprising:
pre-processing the dataset by performing one or more of:
eliminating low-density regions;
replacing the seeds with any ancestor entities that exhibit a better size-density trade-off;
rotating the dataspace; and
sorting the regions.

13. The computer-implemented method of claim 12, wherein post-processing of the extended regions to determine which of the extend regions are detected hotspots comprises one or more of:
checking the candidate hotspots for sufficient density;
undoing any rotation/transformation that occurred in any pre-processing;
eliminating hotspot overlap by merging hotspots or by discarding hotspots of lower density; and
fitting a simple shape to the detected hotspots to make the output more interpretable.

14. The computer-implemented method of claim 4, wherein the output includes information about points in each detected hotspot.

15. A system comprising:
a processor to execute a hotspot detection service of a provider network; and
a memory to store the hotspot detection service, the hotspot detection service including instructions that upon execution are to cause:
finding two or more regions having multiple data points to evaluate for high-density in a dataset, a high-density region indicating a potential hotspot;
extending a size of the found two or more regions to determine borders for these regions;
post-processing of the extended regions to determine which of the extended regions are detected hotspots; and
providing an output indicating any detected hotspot to a requester.

16. The system of claim 15, wherein the provider network further comprises a monitor service to receive the output and provide the output to the requester.

17. The system of claim 15, further comprising:
one or more storage devices to store the dataset.

18. The system of claim 15, wherein the dataset is generated from a streaming data source and pre-processing the dataset by updating a hotspot history data structure and removing any region from further evaluation that has had a threshold number of points fall from a vicinity of the region.

19. The system of claim 15, wherein the dataset is generated from a streaming data source and pre-processing the dataset by updating a sliding window of data points to add one or more arriving points to include in hotspot detection and remove one or more points to include in hotspot detection.

20. The system of claim 15, wherein finding two or more regions to evaluate for high-density in the dataset, a high-density region indicating a potential hotspot comprises one or more of:
using bounding boxes generated by a space partitioning data structure and its higher-dimensional equivalents including walking the space partitioning data structure to find a larger bounding box of appropriate density;
using random sampling of pairs of opposite corners to define bounding boxes;
using the Voronoi cells of a diagram generated by a clustering algorithm; and using the space partitions implicitly generated by a Locality Sensitive Hashing scheme.

* * * * *